July 12, 1960

C. E. ANDERSON ET AL 2,945,184

CONTROL APPARATUS

Filed March 21, 1955

Inventors
Cleophas E. Anderson
William J. Walsh
By Wallace and Cannon
Attorneys

$Cav = 8m + \pi d$

Fig. 3A $Cav = 6m + \pi d$

Fig. 4

Inventors
Cleophas E. Anderson
William J. Walsh
By Wallace and Cannon
Attorneys

July 12, 1960

C. E. ANDERSON ET AL 2,945,184

CONTROL APPARATUS

Filed March 21, 1955

Inventors
Cleophas E. Anderson
William J. Walsh

By Wallace and Cannon
Attorneys

United States Patent Office 2,945,184
Patented July 12, 1960

2,945,184

CONTROL APPARATUS

Cleophas E. Anderson and William J. Walsh, Dubuque, Iowa, assignors to Thermo Electric Manufacturing Co., Dubuque, Iowa, a corporation of Illinois Filed Mar. 21, 1955, Ser. No. 495,694

20 Claims. (Cl. 328—85)

This application is a continuation-in-part of copending original application Serial No. 457,702, filed September 22, 1954, now abandoned.

This invention relates to control apparatus of the potentiometer type.

Control apparatus of the aforesaid character is utilized for controlling many different conditions such as liquid level, temperature, humidity, light conditions and the like, and it is also used for governing indicating means that indicate conditions such as the foregoing, and the primary object of the present invention is to improve and simplify such apparatus and render the same capable of manufacture at a low cost, while at the same time obtaining improved sensitivity in such a way that the operation of the controller is not adversely affected by vibration such as that which may be encountered in many types of installation. A further and related object of the invention is to so embody control apparatus of the aforesaid character that it may be manufactured, installed and adjusted with the minimum of technical personnel.

In attaining the foregoing objectives, the present control apparatus involves the use of saturable reactor means functioning as a reactor-converter, and a further important object of the present invention is to afford an improved reactor converter.

In the control apparatus disclosed in our aforesaid original application it was found that unusually high sensitivity of control was attained, but with the constant demand for further increases in sensitivity in various controller applications or uses, further experimentation has been carried out with this objective in view. As a result of such further experimentation we have discovered that with but slight variations in the circuitry of certain portions of our original apparatus, startling and unexpected increases in sensitivity of control may be attained. Thus, it has been found that the amplification factor of the reactor converter may be increased at least five fold, thus to attain the desired controlling action in response to a much smaller change in the control current.

As the sensitivity was increased in the basic circuits of the original application, it was found that there was an increasing tendency toward oscillation of the ultimate controlling action, and while it was found that this could be overcome by the use of more costly circuit components in association with the reactor converter, resort to such a more costly expedient would of course materially restrict the market available for the highly sensitive controller. It is, therefore, an important objective of the present invention to enable the high sensitivity characteristics of the reactor converter to be utilized without material increase in cost of the controller, and more specifically it is an object of the invention to enable simple, inexpensive and reliable means to prevent oscillation in a highly sensitive controller.

Another important object is to enable a reactor converter to attain better or improved control of an electronic power control tube, and a related object is to accomplish this in a simple and inexpensive way.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principles may be used and structural changes may be made as desired by those skilled in the art without departing from the present invention and the purview of the appended claims.

Figure 1:
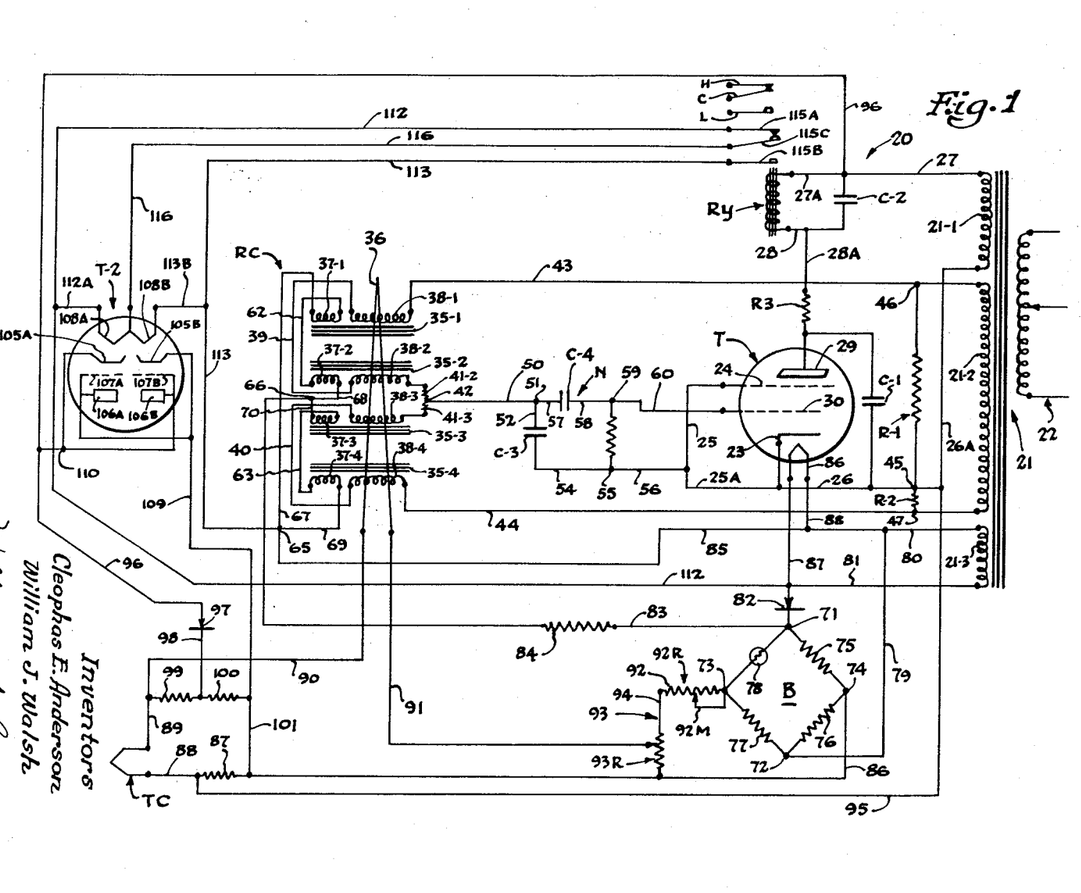
Fig. 1 is a schematic wiring diagram illustrating the preferred embodiment of the control system.

For purposes of disclosure, the invention is herein illustrated in Fig. 1 as embodied in a control system 20 of the potentiometer type, whereby sensing means responsive to a condition to be controlled are effective to govern such condition through a main control relay Ry that has a set of main power control relay contacts H, C and L that are arranged in single pole double throw relation for use in governing the primary conditions producing means that are to be controlled, and which relay also has a similar set of auxiliary contacts that are utilized in the control system as will be described. The sensing means are of the kind that accomplish the desired sensing action by causing minute variations in a direct current voltage, and may take different known forms in accordance with the condition that is to be sensed and controlled. Thus, where the control system is to be employed to govern temperature, the sensing means may take the form of a thermocouple TC, as shown in Fig. 1, and under and in accordance with the present invention, the direct current voltage variations produced in the sensing means such as the thermocouple TC are so utilized as to eliminate the customary need for one or more stages of vacuum tube amplification and enable control to be attained within unusually close limits.

Electric power for the system is supplied through a transformer 21 from an alternating current source 22, and the transformer 21 has secondary windings 21–1, 21–2 and 21–3 that serve to energize various circuits of the system as will be described. Thus, a control tube T, which is afforded preferably by a tube of the thyratron type, is energized from the secondary 21–1 and serves to govern operation of the relay Ry. The tube T has its cathode 23 and its screen grid 24 connected together by wires 25 and 25A, and wires 26 and 26A extend from the cathode 23 to one terminal of the secondary 21–1. The other terminal of the secondary 21–1 is connected by wires 27 and 27A to one terminal of the operating coil of the relay Ry, while the other terminal of the coil of the relay Ry is connected by wires 28 and 28A and a current limiting resistor $R_3$ in series to the plate or anode 29 of the tube T, thus to place the relay Ry under control of the tube T. A capacitance C2 connected across the terminals of the relay coil serves to prevent relay chatter, while a condenser C–1 that is connected between the anode 29 and the wire 26, cooperates with the resistor $R_3$ to afford a filter to prevent the circuit from radiating objectionable radio frequency signals or hash. The tube T also has a control grid 30, and the firing of the tube T is governed through operative association of the grid 30 with a reactor converter RC which is in turn operatively associated with the thermocouple TC so that the output of the reactor converter RC is governed by the thermocouple TC. The novel way in which these primary elements of the system are associated under the present invention will be described in detail after the details of the reactor converter RC have been set forth.

Figure 2:
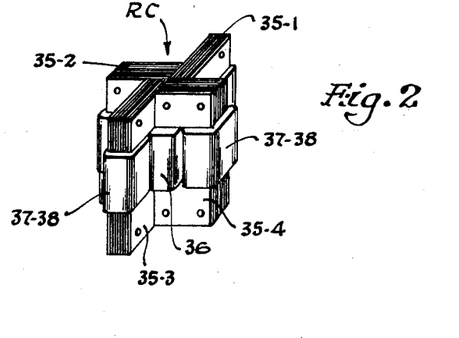
Fig. 2 is a perspective view of the converter reactor of the present invention.
Figure 3:
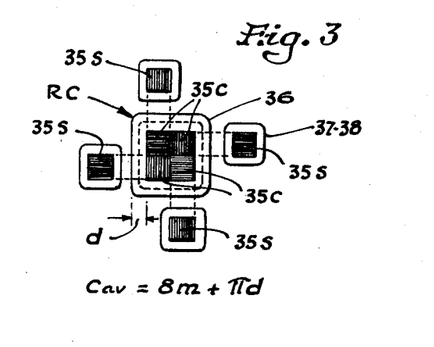
Fig. 3 is a schematic plan view of the converter reactor.
Figure 4:
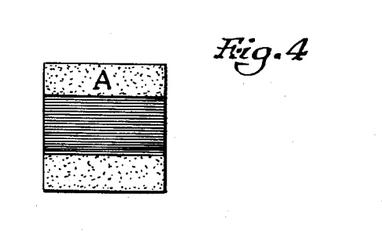
Fig. 4 is a schematic cross sectional view of one of the coils utilized in the converter reactor.

Thus the reactor converter RC is shown diagrammatically in Fig. 1, while the structural characteristics are illustrated in Figs. 2, 3 and 4 of the drawings. The reactor converter RC of the present invention is of such a character as to afford, in a single unit, two legs of an output bridge circuit, with these two legs governed or controlled by a single control winding. In affording such a structure, four single-window cores 35–1 to 35–4 are provided which are made of conventional form of permeable core material having particular characteristics as will be described. The cores 35 each have an inner leg 35C and parallel outer legs 35S, and in the final assembly of the reactor converter RC, the four inner legs 35C are disposed adjacent each other in a side by side relation as shown in Fig. 3 so that the cores 35 project in a generally radial and uniformly spaced relation from the composite central core that is formed by the legs 35C. This, of course, locates the several outer legs 35S in outwardly spaced relation to such composite central core, as will be evident in Fig. 3.

The composite central core afforded by the four central legs 35C has a common control winding 36 wound thereabout as shown in Figs. 2 and 3, while the other or outer legs 35S of the cores 35 each have a bias winding 37 and an output winding 38 wound thereon. Since the windings 37 and 38 on the four different cores 35 are to be related in a particular manner to each other and to other circuit elements, such windings are herein differentiated by the use of suffixes 1 to 4 which correspond to the suffixes of the cores 35 upon which such windings are located.

Thus, the output windings 38–1 and 38–2 are connected in series by a wire 39 so that these two windings may constitute one leg of the bridge above mentioned, while the output windings 38–3 and 38–4 are connected in series by a wire 40 so that these two windings may constitute a second leg of such bridge. The other ends of the windings 38–2 and 38–3 are connected respectively by resistors 41–2 and 41–3 to a common terminal 42 which constitutes one output terminal of the aforesaid bridge. The other terminal of the winding 38–1 is connected by a wire 43 to one terminal of the secondary 21–2 while a wire 44 connects the other terminal of the winding 38–4 to the other terminal of the secondary 21–2. The other two legs of the aforesaid bridge are afforded by resistors R–1 and R–2 that are disposed in series by connection of adjacent ends thereof to a common terminal 45 which is located on or connected in the wire 26 and which constitutes the other output terminal of the bridge. The other end of the resistor R–1 is connected to a terminal 46 in the wire 43, while the other end of the resistor R–2 is connected to a terminal 47 in the wire 44, and thus the terminals 46 and 47 constitute the input terminals of the bridge. The resistors R–1 and R–2 are so proportioned as to establish a normal bias on the tube T which renders the tube normally non-conductive, and as will be described in detail hereinafter, the other output terminal 42 is associated with the control grid 30 of the tube T through an R-C network N in such a way that the varying or controlled output of the bridge may serve to render the tube T conductive while at the same time assuring that the tube T can have no adverse effect upon the control action of the bridge. Thus a wire 50 extends from the terminal 42 to a network terminal 51, and from this terminal 51 a wire 52 extends to one terminal of a shunt condenser C–3, and a wire 54 extends from the other terminal of the condenser C–3 to a terminal 55, the circuit being further extended by a wire 56 from the terminal 55 to the wire 25. A wire 57 extends from the terminal 51 to one terminal of a series condenser C–4, from the other terminal of which a wire 58 extends to a terminal 59, this circuit being extended from the terminal 59 to the control grid 30 by a wire 60. Between the terminals 55 and 59 a resistor R–3 is connected so that the resistor R–3 and the condensers C–3 and C–4 afford the network N.

The bias windings 37–1 and 37–2 constitute a first pair and are connected in series by a wire 62, while the bias windings 37–3 and 37–4 constitute a second pair and are connected in series by a wire 63; and insofar as current flow is concerned, the windings of the two pairs are disposed in what may be termed a reversed relation with respect to their cores 35 so that, with direct current flow in control winding 36, the D.C. flux through one set of cores will increase while such D.C. flux in the other set of cores will decrease, thus to correspondingly increase and decrease the permeability and inductance of the related sets of cores. Thus, D.C. bias terminals 65 and 66 are provided; and from the terminal 65 a wire 67 extends to the left end of the coil 37–1, the wire 62 extending from the right end of this coil to the left end of the coil 37–2; and a wire 68 extends from the right end of the coil 37–2 to the terminal 66. As to the other set or pair of bias coils, a wire 69 extends from the terminal 65 to the right end of the coil 37–4, the left end of which is connected by the wire 63 to the right end of the coil 37–3; and the other or left end of the coil 37–3 is connected by a wire 70 to the terminal 66.

A constant potential direct current source is afforded by a bridge B that is powered by the secondary 21–3 through wires 79, 80, and 81 and rectifier 82. Thus the bridge B has terminals 71, 72, 73 and 74, the terminals 71 and 74 being connected by a resistance 75, the terminals 74 and 72 being connected by a resistance 76, and the terminals 72 and 73 being connected by a resistance 77, while the terminals 73 and 71 are connected by a non-linear resistance which may take the form of a small incandescent lamp 78. The non-linear resistance 78 as thus provided serves to afford voltage regulation to compensate for variations in supply voltage. The bridge B is so designed as to be in perfect dynamic balance at the normal supply voltage, so that variations in supply voltage have no or minimal effect on the output voltage of terminals 73 and 74.

A wire 81 and a rectifier 82 in series connect one terminal of the secondary 21–3 to the terminal 71. A wire 83, which includes a resistor 84, is connected between the terminal 71 and the terminal 66, while a wire 85, connected from the wire 80 to the terminal 65 serves to extend the circuit from the other terminal of secondary 21–3 to the terminal 65, and hence the terminals 65 and 66 are connected to the D.C. source afforded by secondary 21–3 and the rectifier 82.

The secondary 21–3 serves also as a source of heater or filament voltage for the filament 86 of the tube T, such filament being connected by wires 87 and 88 to the wires 81 and 85 as shown in Fig. 1.

The thermocouple TC and the control winding 36 are associated with each other and with the controlled or constant voltage terminals 73 and 74 of the bridge B through potentiometer means so that the voltage applied to the thermocouple TC may be accurately adjusted, and in addition, the thermocouple is provided with a break-protection circuit that is associated therewith in such a manner that line voltage variations will not disrupt the setting established by the potentiometer means. Thus a wire 86, a resistor 87 and a wire 88 extend in series to one terminal of the thermocouple TC, while wires 89 and 90 in series extend from the other terminal of the thermocouple TC to one terminal of the control winding 36. The other terminal of the control winding 36 has a wire 91 extending therefrom to the potentiometer means through which it is to be operatively connected to the terminal 73. Such potentiometer means are afforded by a calibrating rheostat 92 and an adjusting rheostat 93, as shown in Fig. 1. These rheostats have their resistance elements 92R and 93R connected in series by a wire 94, and the other ends of these resistance elements are connected respectively to the terminal 73 and the wire 86. The movable contact 92M of the rheostat 92 is connected to the terminal 73, while the movable member or contact 93M of the rheostat 93 is connected to the wire 91, and the rheostat 92 is employed to adjust the control range of the system, while the rheostat 93 is used to adjust and determine the control point of the system.

The break-protection circuit for the thermocouple TC is provided from the secondary 21-1, a wire 95 being extended from the wire 26A to the juncture between the wire 88 and resistor 87; and the other side of the circuit is afforded by extending a wire 96 to one terminal of a rectifier 97, the other terminal of which is connected by a wire 98 to the juncture of a pair of series connected resistors 99 and 100. The other end of the resistor 99 is connected to the junctures of the wires 89 and 90, while the other end of the resistor 100 is connected by a wire 101 to the juncture of the resistor 87 and the wire 86. The resistors 87, 99 and 100 cooperate with the thermocouple and its leads to afford a bridge circuit which is in balance during normal operation so that there is no output which might affect the setting of the system as such setting is accomplished by the potentiometer means. However, if the thermocouple breaks, the bridge becomes unbalanced, and the output of the unbalanced bridge is applied to the circuit in such a way as to render the tube T non-conductive.

The present system is also provided with a proportioning control which includes a double diode tube T-2, Fig. 1, it being noted that although this tube includes a grid in each section, the wiring is such that each section operates as a diode. This double diode tube T-2 has corresponding sets of electrodes identified as cathodes 105A and 105B, anodes 106A and 106B, grids 107A and 107B, and heating filaments 108A and 108B. The grid and anode of each diode are connected together so as to cause the diodes to tend to be normally conductive, and the diodes are rendered alternately conductive by applying heating current alternately to the filaments 108A and 108B under control of the relay Ry, as will be described. The cathode 105B and the anode 106A are connected by branch leads and a wire 109 to the wire 101; while the cathode 105A and the anode 106B are connected by branch leads and a wire 110 to the wire 96, thus to apply the output voltage of the tube T-2 to the thermocouple TC through resistor 87 in one polarity or the other in dependence upon which of the triode sections is conductive.

The operating power for the tube T-2 is provided from the secondary 21-1 by a circuit including the wires 96 and 101, while the heater current is supplied from the secondary 21-3 under control of the relay Ry. Thus, so far as the heater circuit is concerned, a wire 112 is extended from the wire 81 and is connected by a branch lead 112A to one end of the heater 108A, while a wire 113 is extended from the wire 85 and is connected by a branch 113B to one end of the heater 108B. The wires 112 and 113 are extended respectively to stationary relay contacts 115A and 115B, while the movable relay contact 115C is connected by a wire 116 to the other ends of the two heaters or filaments 108A and 108B. The relay contact 115C is normally engaged with the contact 115A, but when the relay Ry is operated the contact 115C is shifted into engagement with the contact 115B, thus to cause alternate heating of the cathodes 105B and 105A and alternate conductivity of the sections of the tube T-2.

It has been found that the reactor converter hereinabove described produces exceptionally accurate and advantageous results in the present control system, and this is due in part to the nature of the core materials employed, and in part to the physical structure and relationship of the reactor converter.

Thus, with respect to the core materials, it has been found that where the control apparatus is to operate within relatively close limits, the core material should be one which exhibits a relatively large change in permeability with a relatively small change in magnetizing force, and these characteristics can be attained with core materials that are approximately 50% iron and 50% nickel, and which have been grain oriented and hydrogen annealed. Moreover, with respect to such core material, it is important that it possess stability with regard to applied voltages, or in other words, it must be such that changes in voltages applied to the load and bias windings will not create large and undesirable changes or shifts in the reactor converter performance. Insofar as this characteristic is concerned, it is our present conclusion that the core material should be such that the magnetization curve does not have a sharp knee, but on the other hand that such core materials should be selected from alloys where the magnetization curve has a rounded type of knee.

Now as to the improved performance characteristics that result from the structural and electrical relationships that are embodied in the reactor converter RC, we have found that as compared with the use of two structurally independent saturable reactors, the present reactor converter RC gives greatly improved performance, and aside from actual experience, this improvement due to the use of the present structure may be demonstrated mathematically. The improvement that is theoretically possible using only one control winding may be shown by the following analysis:

We may define current density in a D.C. coil as $$\frac{NI}{A_x}$$

where

N is the number of turns
I is the current in the coil
$A_x$ is the cross sectional area of one side of the coil (coil length × depth of winding) as shown in Fig. 4.

The current density in the copper is then $$\frac{NI}{A_x S_f}$$

where $S_f$ is the space factor of the winding.

Dissipation per unit volume in the coil then becomes $$\left(\frac{NI}{A_x S_f}\right)^2 R_v$$

where $R_v$ is the resistivity of the copper. It may be shown that the volume of a coil wound on a rectangular form is equal to $C_{av} A_x$ where $C_{av}$ is the average length of one turn of wire Total dissipation in the coil is then equal to $$\left(\frac{NI}{A_x S_f}\right)^2 R_v C_{av} A_x = \frac{N^2 I^2}{A_x S_f^2} R_v C_{av} = W$$

where W is the power dissipated in the coil. Of the above terms, $R_v$, $S_f$ and $A_x$ remain constant so they may be combined as one constant such that $$\frac{R_v}{A_x S_f^2} = \frac{1}{K^2}$$

and $$C_{av}N^2I^2 = K^2W$$

$$NI = K\sqrt{\frac{W}{C_{av}}}$$

Figure 3A:
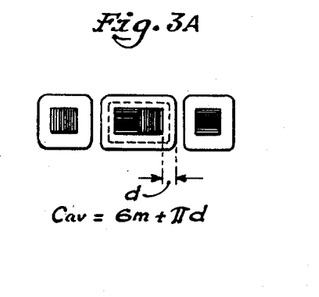
Fig. 3A is a schematic plan view of a conventional saturable reactor that is of the type generally used in control systems.

If two saturable reactors are used to afford a reactor converter, the number of ampere turns in each control winding is $$K\sqrt{\frac{\frac{W}{2}}{6m+\pi d}}$$

Where $d$ is the depth of the winding, $6m+\pi d$ is the average circumference of the winding, and $m \times m$ are the dimensions of the cross section of a leg of the core. See Fig. 3A. In the proposed method, the number of ampere turns producing flux in the equivalent portion of the reactor converter is $$K\sqrt{\frac{W}{8+\pi d}}$$

See Figs. 2 and 3. $d$ will, of course, have a value lying between $\tfrac{1}{2}m$ and $m$. In the previous state of the art, using two saturable reactors to afford a reactor converter and where $d = \tfrac{1}{2}m$ $$NI = .7K\sqrt{\frac{w}{7.57m}}$$

$$= .257K\sqrt{\frac{w}{m}}$$

and where $d = m$ $$NI = .7K\sqrt{\frac{w}{9.14m}}$$

$$= .234K\sqrt{\frac{w}{m}}$$

In the proposed method, using a single four-cored reactor and where $d = \tfrac{1}{2}m$ $$NI = K\sqrt{\frac{w}{9.57m}}$$

$$= .324K\sqrt{\frac{w}{m}}$$

and where $d = m$ $$NI = K\sqrt{\frac{w}{11.14m}}$$

$$= .3K\sqrt{\frac{w}{m}}$$

So the improvement is $d = \tfrac{1}{2}m$            $d = m$ $.324Q - .257Q = .067Q$     $.300Q - .234Q = .066Q$ $\dfrac{.067Q}{.257Q} = 26.1\%$        $\dfrac{.066Q}{.234Q} = 28.2\%$ where $$Q = K\sqrt{\frac{w}{m}}$$

The improvement therefore is shown to be 26.1% and 28.2%. Actually the improvement is somewhat greater because of better coupling between the coil and core.

Figure 5:
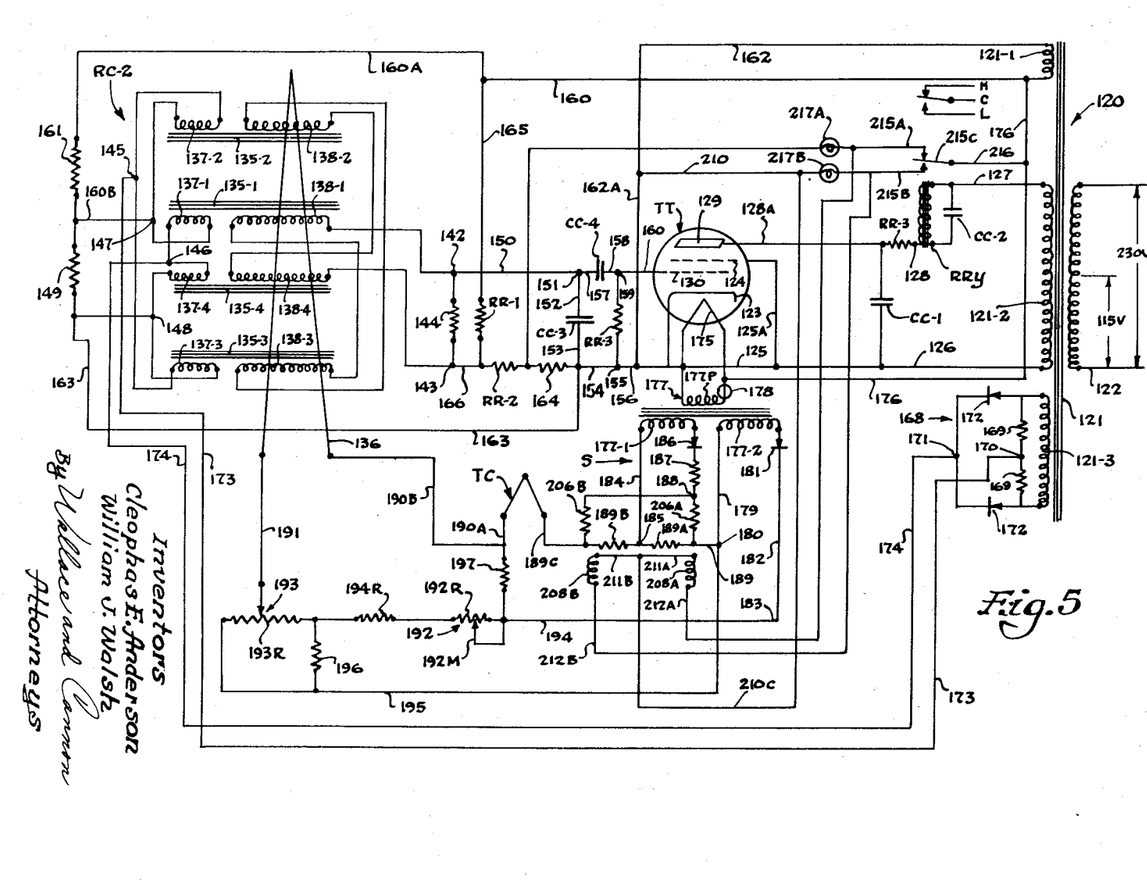
Fig. 5 is a schematic wiring diagram illustrating another embodiment of the control system.

In the alternative form illustrated in Fig. 5, the invention is embodied in a control system 120 of the potentiometer type, whereby sensing means such as a thermocouple TC responsive to a condition to be controlled are effective to govern such condition through a main control relay RRy that has a set of main power control relay contacts H, C and L that are arranged in single pole double throw relation for use in governing the primary conditions producing means that are to be controlled, and which relay also has a similar set of auxiliary contacts that are utilized in the control system as will be described.

Electric power for the system is supplied through a transformer 121 from an alternating current source 122, and the transformer 121 has secondary windings 121-1, 121-2 and 121-3 that serve to energize various circuits of the system as will be described. Thus, a control tube TT, which is afforded preferably by a tube of the thyratron type, is energized from the secondary 121-2 and serves to govern operation of the relay RRy. The tube TT has its cathode 123 and its screen grid 124 connected together by wires 125 and 125A, and a wire 126 extends from the wire 125 to one terminal of the secondary 121-2. The other terminal of the secondary 121-2 is connected by a wire 127 to one terminal of the operating coil of the relay RRy, while the other terminal of the coil of the relay RRy is connected by wires 128 and 128A and a current limiting resistor RR3 in series to the plate or anode 129 of the tube TT, thus to place the relay RRy under control of the tube TT. A capacitance CC2 connected across the terminals of the relay coil serves to prevent relay chatter, while a condenser CC-1 that is connected between the anode 129 and the wire 126, cooperates with the resistor RR3 to afford a filter to prevent the circuit from radiating objectionable radio frequency signals or hash. The tube TT also has a control grid 130, and the firing of the tube TT is governed through operative association of the grid 130 with a reactor converter RC-2 which is in turn operatively associated with the thermocouple TC so that the output of the reactor converter RC-2 is governed by the thermocouple TC. The novel way in which these primary elements of the system are associated under the present invention will be described in detail after the details of the reactor converter RC-2 have been set forth.

Thus the reactor converter RC-2 is shown diagrammatically in Fig. 5, and with the exception of the way in which the windings are proportioned and electrically associated, the physical structure is the same as hereinbefore described in respect to the converter reactor RC. Hence the structural characteristics are illustrated in Figs. 2, 3 and 4 of the drawings.

The composite central core afforded by the four central legs 35C has a common control winding 136 wound thereabout as shown in Figs. 2 and 3, while the other or outer legs 35S of the cores 35 each have a bias winding 137 and an output winding 138 wound thereon. Since the windings 137 and 138 on the four different cores 35 are to be related in a particular manner to each other and to other circuit elements, such windings are herein differentiated by the use of suffixes 1 to 4 which correspond to the suffixes of the cores 35 upon which such windings are located.

Thus, in the converter reactor RC-2 the output windings 138-1, 138-2, 138-3 and 138-4 are connected in series between output terminals 142 and 143, and between these output terminals a high value stabilizing resistor 144 is connected. The bias windings 137-1 to 137-4 are also connected in series, and the juncture between the windings 137-2 and 137-3, and between the windings 137-1 and 137-4 constitute bias input terminals 145 and 146 respectively; while the junctures between the windings 137-1 and 137-2 and between windings 137-3 and 137-4 constitute A.C. input terminals 147 and 148. The A.C. input terminals 147 and 148 are connected by a small resistor 149 which is a part of the voltage dividing network comprising resistor 149 and 161. The tube TT is biased in such a way as to be normally non-conductive, and as will be described in detail hereinafter, the output terminals 142 and 143 are associated with the control grid 130 of the tube TT through a network NN in such a way that the varying or controlled output of the reactor converter RC–2 may serve to render the tube TT conductive. Thus a wire 150 extends from the terminal 142 to a network terminal 151, and from this terminal 151 a wire 152 extends to one terminal of a shunt condenser CC–3, and wires 153 and 154 extend from the other terminal of the condenser CC–3 to a terminal 155, the circuit being further extended by a wire 156 from the terminal 155 to the wire 125 and the cathode 123. A wire 157 extends from the terminal 151 to one terminal of a series condenser CC–4, from the other terminal of which a wire 158 extends to a terminal 159, this circuit being extended from the terminal 159 to the control grid 130 by a wire 160. Between the terminals 155 and 159 a resistor RR–3 is connected so that the resistor RR–3 and the condensers CC–3 and CC–4 afford the network NN.

The bias windings 137, through the terminals 147 and 148, are connected across the secondary 121–1 so as to tend constantly to induce an A.C. output in the output coils 138, and the voltage, phase and wave form of this output is controlled by direct current circuits as will be described. Thus, wires 160 and 160A, a resistor 161 and a wire 160B in series extend from one terminal of the secondary 121–1 to the A.C. input terminal 147 of the bias windings; while wires 162 and 162A in series extend from the other terminal of the secondary 121–1 to the wire 156. This circuit is extended through the wire 154 to a wire 163 which extends to the other A.C. input terminal 148 of the bias windings 137. A protective resistor 164, a resistor RR–2, a resistor RR–1 and a wire 165 extend from the wire 154 to the wire 160, while a wire 166 connects the juncture of the resistors RR–1 and RR–2 to the output terminal 143. It is by proportioning of the resistors RR–1 and RR–2 that the desired normal cut-off bias is applied to the tube TT, it being noted that the connections from the secondary 121–1 bear a reversed phase relation with respect to the plate circuit connections from the secondary 121–2.

The bias windings 137 are thus constantly energized from the A.C. source afforded by the secondary 121–1, and by reason of this the bias windings have the characteristics of a transformer primary tending to induce an A.C. output in the windings 138, and by making the windings 138 with a large number of turns as compared with the windings 137, a high degree of amplification is attained in the output. Such output is, however, governed in the first instance by application of a D.C. bias to the windings 137 through the terminals 145 and 146, and in the second instance by a control D.C. passing through the control winding 136 and of varying voltage and polarity.

A direct current source to supply bias current to the terminals 145 and 146 is afforded by a bridge rectifier circuit 168 that is powered by the secondary 121–3, and as herein shown, the rectifier circuit 168 affords full wave rectification. Thus, a pair of equal value resistors 169 are connected between the ends of the secondary 121–3, and between the resistors 169 an output terminal 170 is afforded, a second output terminal 171 being connected respectively to opposite ends of the pair of resistors 169 by rectifiers 172. The terminal 170 is connected by a wire 173 to the terminal 145 of the bias windings 137, while a wire 174 extends circuit from the other terminal 171 to the terminal 146, and hence the bias winding terminals 145 and 146 are connected to opposite sides of the D.C. source afforded by the full wave rectifier circuit 168.

The secondary 121–1 serves also as a source of heater or filament voltage for the filament 175 of the tube TT, one terminal of such filament being connected to the wire 125, while the other terminal of the filament is connected by a wire 176 to the other terminal of the secondary 121–1, as shown in Fig. 5.

The thermocouple TC and the control winding 136 are associated with each other and with another D.C. source S through potentiometer means so that the voltage applied to the thermocouple TC may be accurately adjusted, and in addition, the thermocouple is provided with a break-protection circuit that is associated therewith in such a manner that line voltage variations will not disrupt the setting established by the potentiometer means.

The additional D.C. source S is afforded by means including a transformer 177 having a primary 177P and two secondaries 177–1 and 177–2, each of which constitutes a portion of half-wave rectifier circuits, as will be described. The primary 177P has one terminal connected to the wire 125, while its other terminal is connected through a non-linear resistance such as a small incandescent bulb 178 to the wire 176, thus to connect the primary 177P across the secondary 121–1 as a power source.

The secondary 177–2 has one end thereof connected by a wire 179 to a terminal 180, while the other end of the secondary 177–2 is connected by a rectifier 181 and a wire 182 in series to a terminal 183. The negative terminal 180 and the positive terminal 183 afford the source of D.C. potentiometer voltage to be applied to the control winding through the thermocouple, as will be described.

The secondary 177–1 has one end thereof connected by a wire 184 to a terminal 185, while the other end thereof is connected by a rectifier 186 and a resistor 187 to a terminal 188 so that the terminals 184 and 188 constitute negative and positive terminals respectively of a D.C. source that is utilized in attaining proportioning operation of the system as will be described hereinafter.

In affording the potentiometer circuit, a wire 189, resistors 189A and 189B and a wire 189C extend in series to one terminal of the thermocouple TC from the terminal 180, while wires 190A and 190B in series extend from the other terminal of the thermocouple TC to one terminal of the control winding 136. The other terminal of the control winding 136 has a wire 191 extending therefrom to the potentiometer means through which it is to be operatively connected to the terminal 183. Such potentiometer means are afforded by a calibrating rheostat 192 and a control point rheostat 193, as shown in Fig. 5. These rheostats have their resistance elements 192R and 193R connected in an intermediate current limiting resistance 194R, and the other end of the resistor 192R is connected by a wire 194 to the terminal 183. The other end of the resistance 193R is connected by a wire 195 to the terminal 180, and a resistance 196 is extended from the wire 195 to the juncture of the resistances 193R and 194R. The movable contact 192M of the rheostat 192 and the wire 194 are connected to the wire 190A through a resistor 197, while the movable member or contact 193M of the rheostat 193 is connected to the wire 191.

The break-protection circuit for the thermocouple TC is provided by the resistor 197 which is of high value and is normally shunted by the thermocouple TC. However, upon failure of the thermocouple TC, the circuit from the secondary 177–2 becomes effective to so energize the control winding 136 as to prevent operation of the tube TT and the relay RRy.

As hereinbefore pointed out, the system shown in Fig. 5 is also provided with a proportioning control, the source of proportioning current being afforded by the secondary 177–1 and the related rectifier 186, and this proportioning current is rendered effective alternately in opposite polarities by thermal means governed by the relay RRy. Thus the terminal 188 is connected respectively to the wire 189 and the wire 189C by non-linear resistances such as thermistors 206A and 206B, and heating coils 208A and 208B are associated respectively with such thermistors. The heating coils 208A and 208B are alternately heated by applying current alternately thereto under control of the relay RRy, as will be described. The arrangement thus described is such that when the resistance of one of the thermistors is lowered due to heating thereof, the greater D.C. current will flow through the heated thermistor, thus to apply a portion of the output voltage of the secondary 177–1 and its associated rectifier 186 to the thermocouple or potentiometer current in one polarity or the other in dependence upon which of the thermistors is in heated condition. The time required for heating and cooling of the thermistors serves, of course, to afford the timing characteristic that is necessary in a proportioning system.

The operating power for the heating of the coils 208A and 208B is supplied from the secondary 121–3 under control of the relay RRy. Thus, so far as the heating circuits are concerned, wires 210 and 210C are extended in series from the wire 162 and are connected by branch leads 211A and 211B to one end of each of the coils 208A and 208B, while wires 212A and 212B are extended respectively from the other ends of these coils to stationary relay contacts 215A and 215B, while the movable relay contact 215C is connected by a wire 216 to the wire 176. The relay contact 215C is normally engaged with the contact 215A, but when the relay RRy is operated the contact 215C is shifted into engagement with the contact 215B, thus to cause alternate heating of the thermistors 208A and 208B and produce alternate reversal of the D.C. proportioning current.

Indicating lights 217A and 217B may be provided as shown in Fig. 5 to indicate the condition of the control system the light 217A being connected between the contact 215A and the midpoint or juncture between the resistors RR–2 and 164, while the light 217B is connected between the contact 215B and the wire 210.

It is to be observed in particular that to attain the requisite constant voltage supply for the potentiometer circuit, the transformer 177 is operated in its fully saturated condition, or in other words, in such a relation that full saturation is maintained throughout the maximum supply voltage variation that is to be expected. Through such an arrangement, highly satisfactory voltage regulation is attained in the D.C. output, and this regulation is made even more accurate by incorporating the non-linear resistance 178 in the input of the transformer.

It will be noted in Fig. 5 that the bias windings 137 are so related to their sets of terminals and are so related to their respective cores that as to direct current or bias current flow, the windings 137–1 and 137–2 will have the bias current flowing in one direction with respect to their cores, while the current flow in the windings 137–3 and 137–4 will be in the other direction with respect to their cores. Moreover, with respect to a selected phase of the alternating current applied to the bias windings, the current flow in the windings 137–2 and 137–3 will be in one direction, while in the windings 137–1 and 137–4 will be in the opposite direction. As to the output windings 138, the connections are such that the alternating current induced in winding 138–1 will oppose the alternating current induced in winding 138–3 and the alternating current induced in winding 138–2 will oppose the alternating current induced in winding 138–4. Inasmuch as the voltage induced in coil 138–1 increases as the voltage in coil 138–3 decreases, and the voltage in coil 138–2 increases as the voltage in coil 138–4 decreases, such increases and decreases occurring as a result of direct current flowing in the control winding, the coils 138 are thus also connected so that the difference between such increases and decreases in said voltages appears at the output terminals 142 and 143.

With such an arrangement the bias current serves normally to so balance the reactor converter RC–2 that there is no appreciable output of alternating current at the output terminals, but when there is direct current flow in the control winding 136, an alternating current output appears at the output terminals in a phase that is dependent upon the polarity of the control current. Further, it should be observed that the output is the result of a transformer action between the coils 137 and 138 so that amplification may be attained while at the same time attaining accurate control of the voltage and phase of such amplified output in response to minute variations in the voltage of the control circuit.

Figures 6, 7, 8:
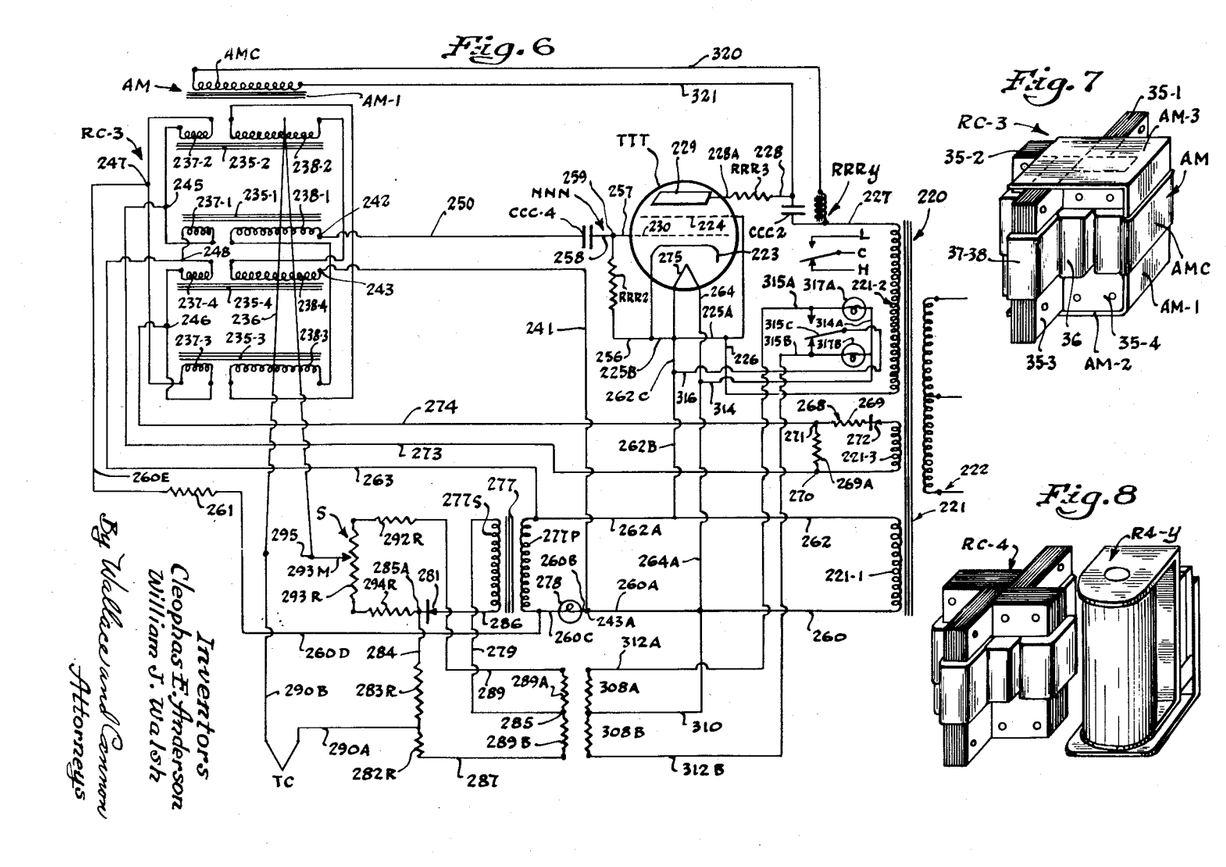
Fig. 6 is a schematic wiring diagram showing another embodiment of the control system.
Fig. 7 is a perspective view of the reactor converter employed in the system of Fig. 6.
Fig. 8 is a fragmentary view showing a modified arrangement applicable to the system shown in Fig. 6.

In Figs. 6 and 7 of the drawings another alternative form of the invention is illustrated as embodied in a controller 220 which embodies further improvements in structure and circuitry whereby sensitivity is greatly increased without any material increase in cost while maintaining reliability of operation at all times. The controller, or control system 220 is of the potentiometer type, wherein sensing means such as a thermocouple TC responsive to a condition to be controlled are effective to govern such condition through a main control relay RRRy that has a set of main power control relay contacts H C and L that are arranged in a single pole double throw relation for use in governing the primary condition producing means that are to be controlled, and which relay also has a similar set of auxiliary contacts that are utilized in the control system as will be described.

Electric power for the system is supplied through a transformer 221 from an alternating current source 222 and the transformer 221 has secondary windings, 221–1, 221–2 and 221–3, that serve to energize various circuits of the system as will be described. Thus a control tube TTT which is afforded preferably by a tube of the thyratron type is energized from the secondary 221–2 and serves to govern operation of relay RRRy.

The tube TTT has its screen grid 224 and its cathode 223 connected together by wires 225, 225–A and 225–B and a wire 226 extends from the wire 225–A to one terminal of the secondary 221–2. The other terminal of the secondary 221–2 is connected by a wire 227 to one terminal of the operating coil of the relay RRRy while the other terminal of the coil of the relay RRRy is connected by wire 320 to one terminal of the auxiliary magnet winding AMC of a magnet AM, the other terminal of the auxiliary magnet winding AM is connected by wires 321, 228 and 228–A and a current limiting resistor RRR3 in series to the plate or anode 229 of the tube TTT thus to place the relay RRRy under control of the tube TTT. The specific function, construction and relationship of the magnet AM will be described in detail hereinafter. A capacitance CCC2 connected across the terminals of the relay coil and series auxiliary magnet AM serve to prevent relay chatter and by-passes the A.C. component of the plate current around the auxiliary magnet AM. The tube TTT also has a control grid 230 and the firing of the tube TTT is governed through operative association of the grid 230 with a reactor converter RC–3 which is in turn operatively associated with the thermocouple TC so that the output of the reactor converter RC–3 is governed by the thermocouple TC. The novel way in which these primary elements of the system are associated under the present invention will be described in detail after the details of the reactor converter RC–3 have been set forth.

Thus the reactor converter RC–3 is shown diagrammatically in Fig. 6 and with the exception of the way in which the windings are proportioned and electrically associated, the physical structure is similar as hereinbefore described in respect to the converter reactors RC and RC–2 (Figs. 1 and 5). Hence, the structural characteristics are illustrated in Figs. 2, 3 and 4 of the drawings, but with the addition of the auxiliary magnet AM as illustrated in Fig. 7. The composite central core afforded by the 4 central legs 35C has a common control winding 236 wound thereabout as shown in Figs. 2 and 3, while the other or outer legs 35S of the core 35 each have a bias winding 237 and an output winding 238 wound thereon. Since the winding 237 and 238 on the four different cores 35 are to be related in a particular manner to each other and to the other circuit elements, such windings are herein differentiated by the use of suffixes 1 to 4 which correspond to the suffixes of the core 35 upon which such windings are located.

Thus, in the reactor RC–3 the output winding 238–1, 238–2, 238–3 and 238–4 are connected in series between output terminals 242 and 243. The bias windings 237–1, 237–2, 237–3 and 237–4 are also connected in series and the juncture between the windings 237–1 and 237–2 are between the windings 237–3 and 237–4 constitute bias terminals 245 and 246 respective while the juncture between windings 237–2 and 237–3 and between windings 237–1 and 237–4 constitute A.C. input terminals 247 and 248.

The tube TTT is biased in such a way as to be normally non-conductive as will be described in detail hereinafter. The output terminals 242 and 243 are associated with the control grid 230 of the tube TTT through a network NNN in such a way that the varying or controlled output of the reactor converter RC–3 may serve to render tube TTT conductive. Thus a wire 250 extends from terminal 242 to one terminal of condenser CCC–4. From the other terminal of condenser CCC–4 a wire 258 extends to a terminal 259, this circuit being extended from the terminal 259 to the control grid 230 by a wire 257. The resistor RRR2 and a wire 256 in series connect terminal 259 to the juncture of wire 225–B and cathode 223 of the tube TTT.

Under the present invention it has been found that the sensitivity of controls of the type herein shown may be greatly increased and this is accomplished primarily by an unexpected increase in the amplification factor of the reactor converter. This increased amplification may be attained under the present invention in reactor converters generally, so that by application of the novel principles embodied in the controller of Fig. 6, as will be described, such increased amplification may be attained in the reactor converters that are included in the other embodiments disclosed herein. Broadly considered, such radical increase in the amplification in the reactor converter is attained by employing a low impedance D.C. bias to the bias windings or a high impedance A.C. to these same windings to afford the A.C. excitation in the device, and best results are obtained by employing both the low impedance D.C. and the high impedance A.C. This may be accomplished readily and easily, and with practically no added expense, as will be described.

In affording the high impedance A.C. excitation in the bias windings 237, these windings, through the terminals 247 and 248, are connected across secondary 221–1 so as to tend constantly to induce an A.C. output in the output coils 238 and the voltage phase and wave form of the output is controlled by direct current circuits as will be described.

Thus, wires 260, 260–A and 260–B, a non-linear resistance 278, wires 260–C, 260–D, resistor 261 and wire 260–E in series extend from one terminal of the secondary 221–1 to A.C. input terminal 247 of bias winding of reactor converter RC–3, while wires 262, 262–A and 263 in series extend from the other terminal of the secondary 221–1 to A.C. input terminal 248 of bias winding of reactor RC–3. The non-linear resistance 261 acts to impart the high impedance in the A.C. supply to the windings 237. It is important to note that this resistance 278 serves an additional function in connection with the potentiometer circuit and the control circuit as will become apparent hereinafter.

Due to the non-linearity of the inductance of primary 277P in relation to instantaneous current the voltage across the primary 277P is non-sinusoidal, the resistance 278 provides a resistance across which this non-sinusoidal voltage appears, making it thus possible to apply this non-sinusoidal voltage to the input terminals 247 and 248 of reactor RC–3 through resistor 261.

The alternating current that is thus supplied is non-sinusoidal or peaked in character, and in practice it has been found that this results in an even more highly peaked characteristic in the output of the reactor converter, thus to render the output more suitable for governing the control tube. The bias windings 237 are thus constantly energized by high impedance A.C. from the A.C. source afforded by the secondary 221–1, and by reason of this the bias windings have the characteristics of a transformer primary tending to induce an A.C. output in the windings 238, and by making the output or secondary windings 238 with a large number of turns, a high degree of amplification is attained in the output. Such output is however governed in the first instance by application of a D.C. bias to the bias windings 237 through the terminals 245 and 246 and in the second instance by a control D.C. passing through the control winding 236 and of varying voltage and polarity.

As pointed out hereinabove, the D.C. bias for the windings 237 is supplied at low impedance, and in accomplishing this a direct current source to supply bias current to the terminals 245 and 246 is afforded by a rectifier circuit 268 that is powered by the secondary 221–3 and as herein shown the rectifier circuit 268 affords half wave rectification. Thus, rectifier 272, resistors 269 and 269–A are connected in series across secondary 221–3. A voltage divider circuit is provided by resistors 269 and 269–A and in addition resistor 269–A provides a low impedance D.C. source for the bias winding 237. An output terminal 271 is afforded at the juncture of resistors 269 and 269–A and a second output terminal 270 is afforded at the juncture 269–A and one terminal of secondary 221–3. The terminal 270 is connected by a wire 273 to terminal 245 of bias winding 237 while a wire 274 extends circuit from the other terminal 271 to the terminal 246 and hence, the bias winding terminals 245 and 246 are connected to opposite sides of the D.C. source afforded by the half wave rectifier circuit 268.

Cut-off bias for the tube TTT is provided also by secondary 221–1, one terminal of which is connected to the cathode of tube TTT by wires 262, 262–B, 262–C and 225–B in series. The other terminal of secondary 221–1 supplies the cut-off bias to grid 230 of tube TTT by wires 260, 260–A, 241, output windings 238, wire 250, condenser CCC–4 and wires 258 and 257 in series, it being noted that secondary 221–1 is so connected that the voltage supplied by it to the grid 230 of tube TTT bears a reversed phase relation to the voltage supplied by winding 221–2 to the plate 229 of the tube TTT.

The secondary 221–1 serves also as a source of heater or filament voltage for the filament 275 of the tube TTT. Thus filament voltage is supplied from one terminal of secondary 221–1 by wires 262, 262–B and 262–C and from the other terminal of secondary 221–1 by wires 260, 264–A and 264.

The thermocouple TC and the control winding 236 are associated with each other and with another D.C. source S through a potentiometer means so that the difference between the voltage generated by thermocouple TC and an accurately adjustable voltage afforded by the potentiometer means is applied to control winding 236.

The D.C. source S is afforded by means including a transformer 277 having a primary 277P and a secondary 277S and a rectifier 281 as will be described. The primary 277P has one terminal connected to wire 262–A extended by wire 262 to one terminal of secondary 221–1. The other terminal of primary 277P is connected by a wire 260–C through the non-linear resistance 278, which may take the form of a small incandescent bulb, and extended by wires 260–B, 260–A and 260 to the other terminal of secondary 221–1 thus to connect primary 277P across secondary 221–1 as a power source. The secondary 277S has one terminal connected by a wire 279 to a terminal 285 while the other end of the secondary 277S is connected by a wire 286 through a rectifier 281 to terminal 285A. The negative terminal 285 and a positive terminal 285A afford the source of D.C. potentiometer voltage to be applied to the control winding 236 through the thermocouple TC as will be described. One terminal of potentiometer 293–R is connected to positive terminal 285–A through calibrating resistor 294–R while the other terminal of potentiometer 293–R is connected to negative terminal 285 through resistor 292–R, wire 289 and resistor 289–A, thus supplying D.C. current to the potentiometer 293–R from the D.C. source S at terminals 285 and 285A.

Cold junction compensation of the thermocouple TC is provided by a resistance 282–R that changes in value with temperature. One end of this resistance is connected to positive terminal 285–A through current limiting resistor 283–R and wire 284. The other end of resistor 282–R is connected to negative terminal 285 through wire 287 and resistor 289–B, thus supplying D.C. current to the cold junction compensating resistor 282–R from the D.C. source S. Thus a reference point at the juncture of resistors 282–R and 283–R is provided, such reference being corrected for ambient temperature variations of the cold junction by the variable voltage drop in resistor 282–R.

The movable contact 293–M of potentiometer 293–R is connected to terminal 295 thus affording a selectable known voltage between terminal 295 and the reference point at the juncture of resistor 282–R and 283–R. Wire 290–A connects the juncture of resistors 282–R and 283–R to the negative terminal of thermocouple TC while the positive terminal of the thermocouple TC is connected to one side of the control winding by a wire 290–B. The other side of the control winding 236 is connected to terminal 295. Thus the difference between the selected potentiometer voltage and the thermocouple voltage is applied to the control winding 236 of the reactor converter RC–3.

The break protection circuit for the thermocouple TC is provided by making the A.C. bias voltage supplied by secondary 221–1 to the grid 230 of tube TTT somewhat greater than is normally required to obtain a non-conducting state of tube TTT. Therefore in order to make tube TTT conductive, a small additional out of phase voltage from the output windings 238 of reactor converter RC–3 is superimposed upon the A.C. bias voltage to grid 230 of tube TTT. This small additional out of phase voltage becomes progressively greater as the thermocouple TC voltage becomes progressively smaller than the potentiometer voltage and the current flow in control winding 236 becomes greater as will be described. Thus, this additional voltage becomes large enough to cause conduction in tube TTT only when the thermocouple TC voltage is less than the potentiometer voltage causing a current flow in the control winding. However, upon failure of the thermocouple TC the circuit of the control winding 236 is broken so there is no current flow in the control winding 236 and minimal output voltage from the output windings 238 too small to initiate or sustain conductance in tube TTT and therefore tube TTT becomes non-conductive providing break protection for the thermocouple TC circuit.

The system shown in Fig. 6 is also provided with a proportioning control. The potentiometer circuit is basically a bridge circuit with resistance 289–A and 289–B in adjacent legs, therefore, changing the values of resistances 289A and 289B simultaneously in opposite directions will vary the potentiometer voltage between terminal 295 and the reference point at the juncture of resistors 282–R and 283–R. Changes of values of resistances 289A and 289B is brought about by use of positive or negative coefficient of resistance resistors and thermal means such as heater coils 308A and 308B closely associated with resistors 289–A and 289–B respectively. It is noted that both resistances 289A and 289B must have the same characteristics, or in other words, both must be positive, or both negative, as the case may be. The heating coils 308–A and 308–B are alternately heated by applying a current alternately thereto under control of relay RRRy thus changing the values of resistance of resistors 289–A and 289–B. The time required for heating and cooling of the resistors 289–A and 289–B serves of course to afford the timing characteristics that are necessary in a proportioning system.

The operating power for the heating of the coils 308A and 308B is supplied by the secondary 221–1 under control of the relay RRRy. Thus so far as the heating circuits are concerned, from one terminal of secondary 221–1 a wire 260 extended by wire 310 is connected to the juncture of heater coils 308–A and 308–B. From the other terminal of secondary 221–1 wire 262 extended by wire 262–B and 316 connect to movable contact arm 315–C of relay RRRy. Stationary contact 315–A of relay RRRy is connected by wire 312–A to one terminal of heater coil 308–A while stationary contact 315–B of relay RRRy is connected by wire 312–B to one terminal of heater coil 308–B.

The relay contact 315C is normally engaged with the contact 315B but when the relay RRRy is operated, the contact 315–C is shifted into engagement with the contact 315–A thus to cause alternate heating of the heater coils 308–B and 308–A, changing values of resistance of resistors 289–B and 289–A, thus also alternately varying the selectable potentiometer voltage. Such variation of the selectable potentiometer voltage effects the desired proportioning action. Indicating lights 317A and 317B may be provided as shown in Fig. 6 to indicate the condition of the control circuit. Power supply for the indicating lights 317A and 317B is provided for by secondary 221–1. From one terminal of secondary 221–1 wires 260, 264–A and 314 in series connect to one terminal of indicating light 317B and a wire 314–A extends to one terminal of indicating light 317–A. The other terminal of 317–B is connected to stationary contact 315–B and the other terminal of indicating light 317–A is connected to stationary contact 315–A of relay RRRy. From the other terminal of secondary 221–1 wire 262 extended by wire 262–B and 316 connect to movable contact arm 315–C of relay RRRy thus indicating lights 317–A and 317–B are under control by action of the relay RRRy.

It is to be observed in particular that to attain the requisite constant voltage supply for the potentiometer circuit, the transformer 277 is operated in its fully saturated condition, or in other words, in such a relation that full saturation is maintained throughout the maximum supply voltage variation that is to be expected. Through such an arrangement, highly satisfactory voltage regulation is attained in the D.C. output, and this regulation is made even more accurate by incorporating the non-linear resistance 278 in the input of the transformer.

It will be noted in Fig. 6 that the bias windings 237 are so related to their sets of terminals and are so related to their respective cores that as to direct current or bias current flow, the windings 237–1 and 237–4 will have the bias current flowing in one direction with respect to their cores, while the current flow in the windings 237–2 and 237–3 will be in the other direction with respect to their cores. Moreover, with respect to a selected phase of the alternating current applied to the bias windings, the current flow in the windings 237–1 and 237–2 will be in one direction, while in the windings 237–3 and 237–4 will be in the opposite direction. As to the output windings 238, the connections are such that the alternating current induced in winding 238–1 will oppose the alternating current induced in winding 238–3 and the alternating current induced in winding 238–2 will oppose the alternating current induced in winding 238–4. Inasmuch as the voltage induced in coil 238–1 increases as the voltage in coil 238–3 decreases, and the voltage in coil 238–4 increases as the voltage in coil 238–2 decreases, such increases and decreases occurring as a result of direct current flowing in the control winding 236, the coils 238 are thus also connected so that the difference between such increases and decreases in said voltages appears at the output terminals 242 and 243.

With such an arrangement the bias current serves normally to so balance the reactor converter RC-3 that there is no appreciable output of alternating current at the output terminals, but when there is direct current flow in the control winding 236, an alternating current output appears at the output terminals in a phase that is dependent upon the polarity of the control current. Further, it should be observed that the output is the result of a transformer action between the coils 237 and 238 so that amplification may be attained while at the same time attaining accurate control of the voltage and phase of such amplified output in response to minute variations in the voltage of the control circuit.

As hereinabove pointed out, the amplification factor of the reactor converter RC3 has been radically increased through utilization of low impedance D.C. and high impedance A.C. in the windings 237, and while this aspect of the invention is susceptible of advantageous use independently of the other features embodied in the controller of Fig. 6, such independent use involves the isolation of the various components by shielding and filtering techniques or other means. This, of course, complicates and increases the cost of the controller, and hence we prefer to utilize the high amplification characteristics in the reactor converter and the cheaper multiple-secondary transformer in association with a protective lock-up means such as the magnet AM which effectually offsets the unbalance that would otherwise result from surges and transient currents when the tube TTT becomes conductive. These surges and transient currents would, in the absence of a protective lock-up means such as the magnet AM, create an undesired oscillation in the controller, and yet we have discovered that this may be easily overcome by applying magnetic offsetting forces to the reactor converter as an incident to the operation of the tube, or in other words concurrently with the creation of the condition that initiates the surge above mentioned.

While such offsetting magnetic forces may be applied in different ways we presently prefer to utilize the auxilary magnet AM, the coil AMC of which is connected in the plate circuit of the tube TTT. The magnet AM as shown in Fig. 7 is afforded by a core AM-1 made from a thin flat sheet or strip of usual core material and having the coil AMC wound thereabout. In the interests of efficiency of operation the core AM-1 preferably has parallel arms AM-2 and AM-3 formed at the ends thereof so that they may extend across and preferably frictionally engage opposite ends of the composite core structure 35-1 and 35-4 of the reactor converter. Thus, the magnet AM has an efficient magnetic association with the core structure 35-1 to 35-4, and by proper connection in the plate circuit of the tube, the magnetic field created by the magnet AM may be caused to effectually offset the undesirable effects of the surge currents that are applied to the reactor converter RC-3 when the tube becomes conductive.

Rather than endeavor to explain the proper connections for the magnet AM in theoretical terms, it is pointed out that such proper connections may be checked and determined merely by reversal of the connections of the wires 320 and 321 with the coil AMC. If these wires are connected in an improper relation, the controller 220 will oscillate quite noticeably, and if this occurs, a mere reversal of the wires 320 and 321 will produce the proper operative relation for the magnet AM with respect to the converter reactor RC-3.

As pointed out hereinabove, the desired lock-up action may be attained by other means, and one such alternative arrangement illustrated in Fig. 8. Thus as shown in Fig. 8, the relay R4y is disposed in side by side relation with respect to the reactor converter RC-4 which may take the same form as the reactor converter RC-3 but with the magnet AM removed or eliminated. The relay R4y is disposed with its core parallel to the adjacent outer core leg of the reactor converter RC-3, thus to effectually couple the magnetic field of the relay with the reactor converter. The proper connection of the relay in the plate circuit of the tube to obtain the requisite lock-up action may be determined in the same way as with the magnet AM. Thus, the lock-up action is attained without requiring a separate magnet AM; and it is to be further noted that a further structural variation, operating to the same end may be attained by utilizing one or more of the core elements 35 as the core for the winding AMC of Fig. 6, thus to eliminate the need for the core AM-1.

From the foregoing description, it will be evident that the present invention affords an improved and simplified electrical control apparatus of the potentiometer type, and that such improved apparatus is of such a character that it is vibration resistant and may be manufactured at a reasonable cost. Moreover, the apparatus that is thus afforded may be manufactured, installed and adjusted with the minimum of technical personnel.

It will also be evident that the present invention affords a controller of unusually high sensitivity, and that such unusually high sensitivity may be effectually utilized in an economic manner through the cooperating action of lock up means that counteract and overcome current surges that would otherwise cause oscillation of the controller. Furthermore, the peaked A.C. supply to the converter reaction results under the present invention in more effective operation of the control tube.

It will also be evident that the present invention enables a controller of high sensitivity to be afforded with simple circuitry and in an economic manner, and further that such improved controller is rugged in character and avoids the objectionable characteristics such as oscillation that have heretofore been found in high sensitivity controllers.

It will also be apparent from the foregoing that the present invention affords improved saturable reactor means that have great utility in control applications.

Thus, while we have illustrated and described the preferred embodiments of our invention, is to be understood that these are capable of variation and modification, and we therefore do not wish to be limited to the precise details set forth, but desire to avail ourselves of such changes and alterations as fall within the purview of the following claims.

We claim:

1. In a control apparatus of the potentiometer type for controlling a selected condition, a phase-sensitive thermionic tube normally biased non-conductive, a control relay having its operating coil connected in the plate circuit of said tube, a reactor converter comprising ferromagnetic core means having a set of output windings mounted on said core, and output terminals therefor, a coupling network connecting said terminals to the control grid of said tube to render said tube conductive when the output of said output windings is of a particular phase, said reactor converter having a set of bias windings mounted on said core means, means for applying alternating current to one set of said windings, means for applying direct current to said bias windings, and a common control winding mounted on said core means, a voltage producing sensing means for sensing said condition, a transformer operating at full saturation and having a secondary with a rectifier in series therewith to afford a constant voltage direct current source, and means including a potentiometer connecting said sensing means and said control winding in series to said source to vary the phase and amplitude of the output signal developed in said output windings.

2. In a control apparatus of the potentiometer type, an electrically operable control device, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a source of constant potential direct current, means connecting said source in series with the control winding and said sensing element including potentiometer means, and means operatively connecting said output terminals to said device for operating the same.

3. In a control system, control means operable between two settings in response to reversals of phase of an alternating current applied thereto, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a source of constant potential direct current, means connecting said source in series with the control winding and said sensing element including potentiometer means, and means operatively connecting said output terminals to said control means for operating the same.

4. In an electrical control system of the potentiometer type, control means operable between two settings in response to reversals of phase of an alternating current applied thereto, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a source of constant potential direct current, means connecting said source in series with the control winding and said sensing element including potentiometer means, a stabilizing resistor between said output terminals, and means operatively connecting said output terminals to said control means for operating the same.

5. In a control system, control means operable between two settings in response to reversals of phase of an alternating current applied thereto, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a source of constant potential direct current, comprising a transformer operated at saturation and having a non-linear resistance in its primary circuit and having a secondary having a rectifier in its output circuit, means connecting said output circuit of said source in series with the control winding and said sensing element including potentiometer means, and means operatively connecting said output terminals to said control means for operating the same.

6. In a control apparatus of the potentiometer type, an electrically operable control device, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a constant voltage direct current source connected in series with the control winding and said sensing element including potentiometer means to afford a control circuit, a pair of circuits from a constant potential direct current source for applying the direct current in one polarity or the other to said control circuit, means for rendering said pair of circuits effective alternately including a pair of heaters, means operated by said device for rendering said heaters operable alternately as said device is in its operated or non-operated condition, and means operatively connecting said output terminals to said device for operating the same.

7. In a control apparatus of the potentiometer type, an electrically operable control device, a voltage producing sensing element, a reactor converter comprising four single window cores each having a parallel inner and outer legs and disposed with said inner legs in side by side abutment to afford a central composite leg and said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, means applying an alternating current to said first pair of input terminals, means applying a direct current bias across said second pair of input terminals, a transformer operated normally in saturated condition and having a primary circuit with a non-linear resistance therein, a first secondary having a rectifier in series therewith and with said first secondary connected in series with the control winding and said sensing element including potentiometer means, a second secondary in said transformer having a rectifier in series, a pair of circuits from said second secondary for applying the rectified output thereof in one polarity or the other, thermistors in each of said circuits, heaters for said thermistors, means operated by said device for rendering said heaters operable alternately as said device is in its operated or non-operated condition, and means operatively connecting said output terminals to said device for operating the same.

8. In a controller of the potentiometer type, an electrically operable control device, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, a high impedance source for supplying alternating current to said first pair of input terminals, a low impedance source for applying direct current bias across said second pair of imput terminals, a source of constant potential direct current, means connecting said source in series with the control winding and said sensing element including potentiometer means, and means operatively connecting said output terminals to said device for operating the same.

9. In a controller of the potentiometer type, an electrically operable control device, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, a high impedance source for applying alternating current to said first pair of input terminals, a low impedance source for applying direct current bias across said second pair of input terminals, a source of constant potential direct current, means connecting said source in series with the control winding and said sensing element including potentiometer means, and electromagnet means magnetically associated with said reactor converter and rendered operative as an incident to the operation of said device to offset the effect of current surges caused by initiation of the operation of said device.

10. In a controller, a reactor converter comprising ferromagnetic core means having bias windings, output windings and a control winding mounted thereon, potentiometer type sensing means connected to said control winding for impressing a control current on said control winding in a polarity and magnitude dependent upon a condition sensed, a governing relay, a control tube having a plate, a cathode and a control grid, a multiple secondary transformer having a first secondary connected in series with said relay in the plate circuit of said tube, means connected to a second secondary of said transformer and providing a high impedance connection for supplying alternating current to said bias windings, means connected to a third secondary of said transformer for applying a voltage-regulated low impedance D.C. bias to said bias windings, means also connected to said second secondary to apply a voltage regulated direct current to said control winding, and auxiliary electromagnet means associated with said reactor converter and operable as an incident to operation of said relay to offset surge conditions produced in said reactor converter when said relay is operated.

11. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, a control tube having a plate, a cathode and a control grid, a multiple-secondary transformer having a first secondary connected in series in the plate circuit of said tube, means connected to a second secondary of said transformer and providing a high impedance connection for supplying alternating current to said bias windings, means connected to a third secondary of said transformer for applying a voltage regulated low impedance D.C. bias to said bias windings, means also connected to said second secondary to apply a voltage regulated direct current to said control winding, and auxiliary electromagnet means associated with said reactor converter and operable as an incident to operation of said tube to offset surge conditions produced in said reactor converter when conductivity in said tube is initiated.

12. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, a governing relay, a control tube having a plate, a cathode and a control grid, a multiple secondary transformer having a first secondary connected in series with said relay in the plate circuit of said tube, means connected to a second secondary of said transformer and providing a high impedance connection for supplying alternating current to said bias windings, means connected to a third secondary of said transformer for applying a voltage regulated low impedance D.C. bias to said bias windings, means also connected to said second secondary to apply a voltage regulated direct current to said control winding, and said relay being disposed in a magnetically coupled relation to said reactor converter and operable as an incident to operation of said relay to apply its magnetic field to said reactor converter to offset surge conditions produced in said reactor converter when said relay is operated.

13. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, an electrically operated governing device controlled by the output of said output windings, means for supplying voltage regulated unidirectional current to said control winding, means for supplying alternating current to said bias windings and means for supplying direct bias current to said bias windings, and magnet means rendered effective as an incident to initiation of operation of said governing device to prevent oscillation of the output of said output windings.

14. A reactor converter of the character described comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, a common control winding encircling said central composite leg, and a lock-up winding magnetically associated with said cores for overcoming the effect of surges in the supply voltage applied to said windings.

15. A reactor converter of the character described comprising core means providing a plurality of legs, output windings connected in series between a pair of output terminals and encircling certain of said legs, bias windings encircling certain of said legs of said core means, means connecting said bias windings in continuous series and affording a first and second pair of input terminals arranged alternately at the junctures between the series connected bias coils, a common control winding encircling certain of said legs, and a lock-up winding magnetically associated with said core means for offsetting the effect of surges present in the voltage supply.

16. In a control system, an electrically operated control device operable between two settings in response to reversals of phase of an alternating current applied thereto, a voltage producing sensing element, a reactor converter comprising four single window cores each having an inner leg and a parallel outer leg and disposed with said inner legs in side by side abutment to afford a central composite leg and with said outer legs disposed outwardly of and in spaced relation about said composite leg, four output windings connected in series between a pair of output terminals and encircling the respective outer legs of said cores, four bias windings encircling the respective outer legs of said cores, means connecting said bias windings in continuous series and affording a first and second pair of input terminals arranged alternately at the junctures between the series connected bias coils, and a common control winding encircling said central composite leg, a high impedance source for applying alternating current to said first pair of input terminals, a low impedance source for applying direct current bias across said second pair of input terminals, a source of constant potential direct current, comprising a transformer operated at saturation and having a non-linear resistance in its primary circuit and having a secondary having a rectifier in its output circuit, means connecting said output circuit of said source in series with the control winding and said sensing element including potentiometer means, means operatively connecting said output terminals to said device for operating the same, and electromagnet means in magnetic association with said reactor converter in a polarity effective to offset surges produced in said reactor converter when said device is operated.

17. In a controller, a reactor converter comprising ferromagnetic core means having output windings and bias and control winding mounted thereon, sensing means connected to said control winding for impressing a control current on said control winding in a polarity and magnitude dependent upon a condition sensed, a governing device controlled by the output of said output windings, means comprising a low impedance source for supplying said bias winding with alternating current of a peaked non-sinusoidal wave form, means comprising a low impedance source for supplying direct bias current to said bias windings, and a lock-up winding magnetically associated with said reactor converter for offsetting the effect of surges appearing in the supply voltage.

18. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, an electrically operated governing device controlled by the output of said output windings, means for supplying alternating current to said bias windings and means for supplying direct bias current to said bias windings, and magnet means rendered effective as an incident to initiation of operation of said governing device to prevent oscillation of the output of said output windings.

19. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, a control tube having a plate, a cathode and a control grid, a multiple-secondary transformer having a first secondary connected in series in the plate circuit of said tube, means connected to a second secondary of said transformer and providing a high impedance connection for supplying alternating current to said bias windings, means connected to a third secondary of said transformer for applying a voltage regulated direct current bias to said bias windings, and auxiliary electromagnet means associated with said reactor converter and operable as an incident to operation of said tube to offset the effect of surge conditions produced in said reactor converter when conductivity in said tube is initiated.

20. In a controller, a reactor converter comprising ferromagnetic core means having bias windings, output windings and a control winding mounted thereon, sensing means connected to said control winding for impressing a control current on said control winding in a polarity and magnitude dependent upon a condition sensed, a governing relay, a control tube having a plate, a cathode and a control grid, a multiple secondary transformer having a first secondary connected in series with said relay in the plate circuit of said tube, means connected to a second secondary of said transformer for supplying alternating current to said bias windings, means connected to a third secondary of said transformer for applying a voltage regulated low impedance D.C. bias to said bias windings, and said relay being disposed in a magnetically coupled relation to said reaction converter and operable as an incident to operation of said relay to apply its magnetic field to said reactor converter to offset the effect of surge conditions produced in said reactor converter when said relay is operated.

References Cited in the file of this patent

UNITED STATES PATENTS

| 2,431,237 | Freeman | Nov. 18, 1947 |
| 2,617,090 | Ogle | Nov. 4, 1952 |
| 2,677,097 | Carleton | Apr. 27, 1954 |
| 2,680,215 | Mershon | June 1, 1954 |
| 2,715,721 | Behn | Aug. 16, 1955 |
| 2,717,957 | Ohlheiser | Sept. 13, 1955 |
| 2,820,109 | Dewitz | Jan. 14, 1958 |
| 2,832,019 | Cohen | Apr. 22, 1958 |
| 2,835,450 | Brown et al. | May 20, 1958 |
| 2,843,813 | Stammerjohn | July 15, 1958 |

OTHER REFERENCES

"Magnetic Amplifiers of the Balance Detector Type" (Geyger), December 1949, AIEE Miscellaneous Paper 50–93. Fig. 36 relied on.